Figure 1:
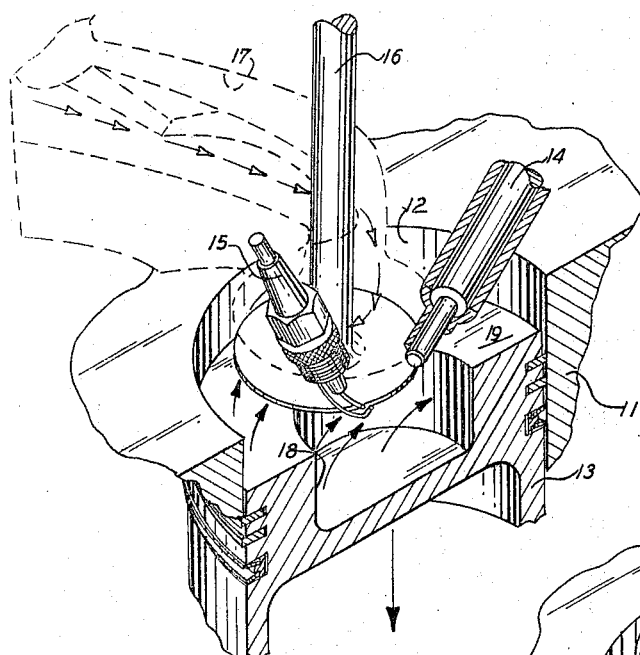
Figure 2:
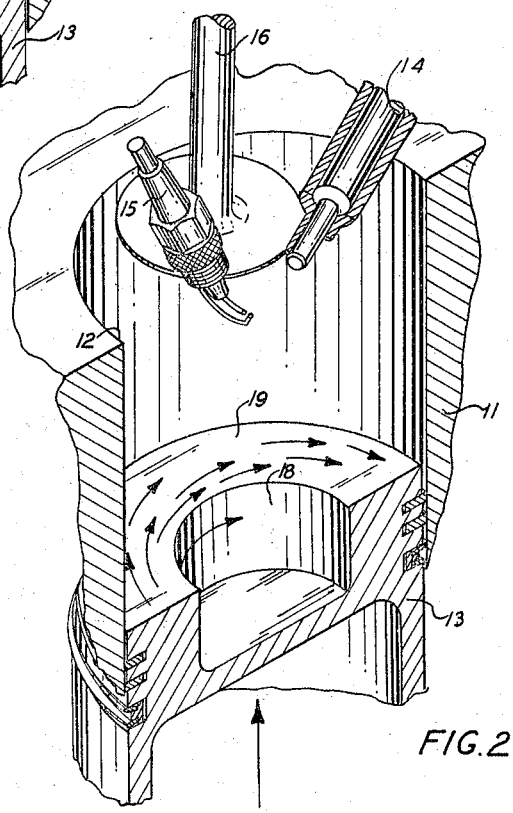

April 25, 1967     I. N. BISHOP ETAL     3,315,650
INTERNAL COMBUSTION ENGINE COMBUSTION PROCESS
Filed Sept. 17, 1965     7 Sheets-Sheet 1

IRVING N. BISHOP
LASZLO HIDEG
ALADAR O. SIMKO
INVENTORS

BY John R. Faulkner
Ernest A. Beutler
ATTORNEYS

April 25, 1967 I. N. BISHOP ETAL 3,315,650
INTERNAL COMBUSTION ENGINE COMBUSTION PROCESS
Filed Sept. 17, 1965 7 Sheets-Sheet 2

IRVING N. BISHOP
LASZLO HIDEG
ALADAR O. SIMKO
INVENTORS

BY John R. Faulkner
Ernest A. Beutler
ATTORNEYS

IRVING N. BISHOP
LASZLO HIDEG
ALADAR O. SIMKO
INVENTORS

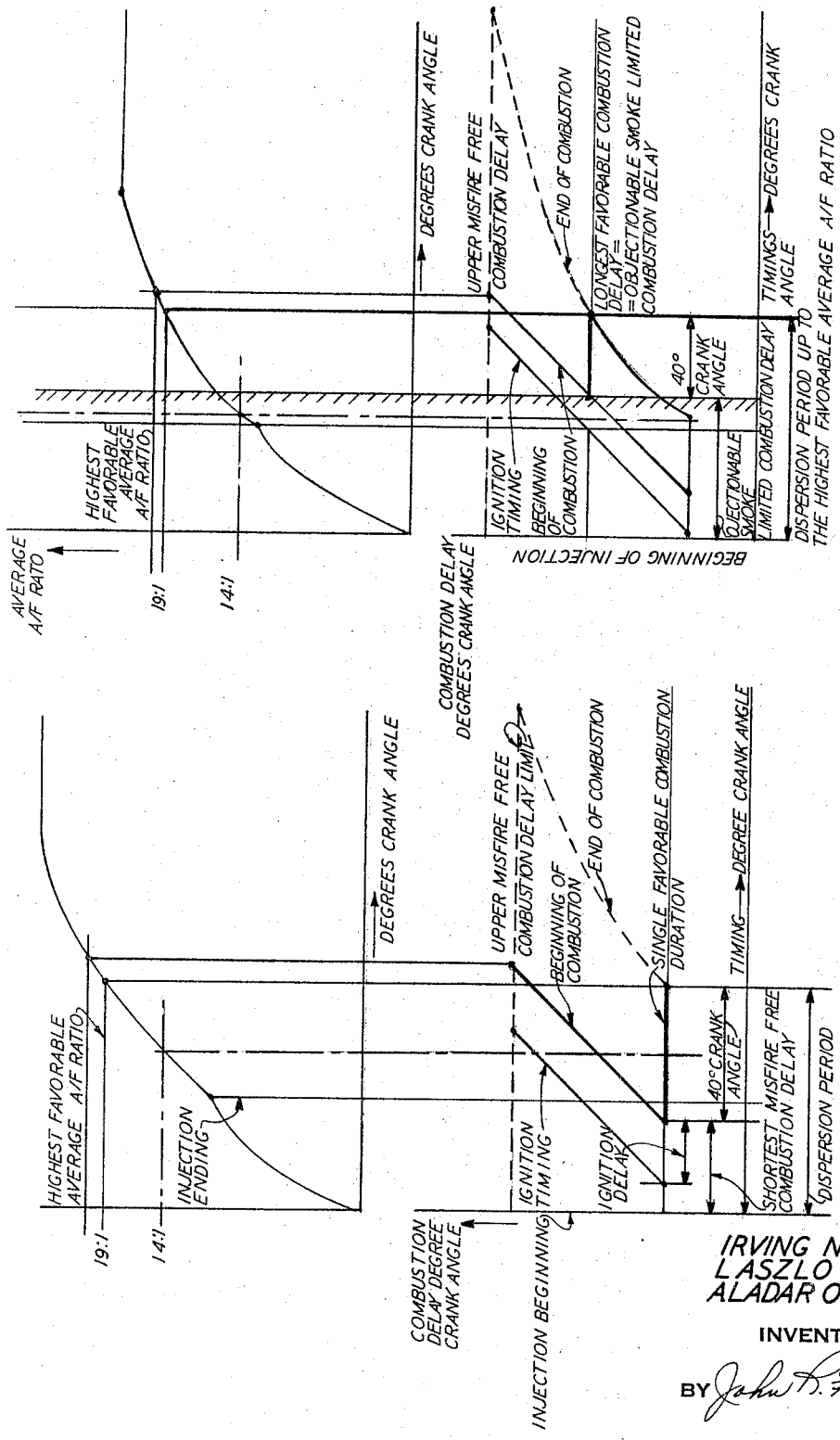

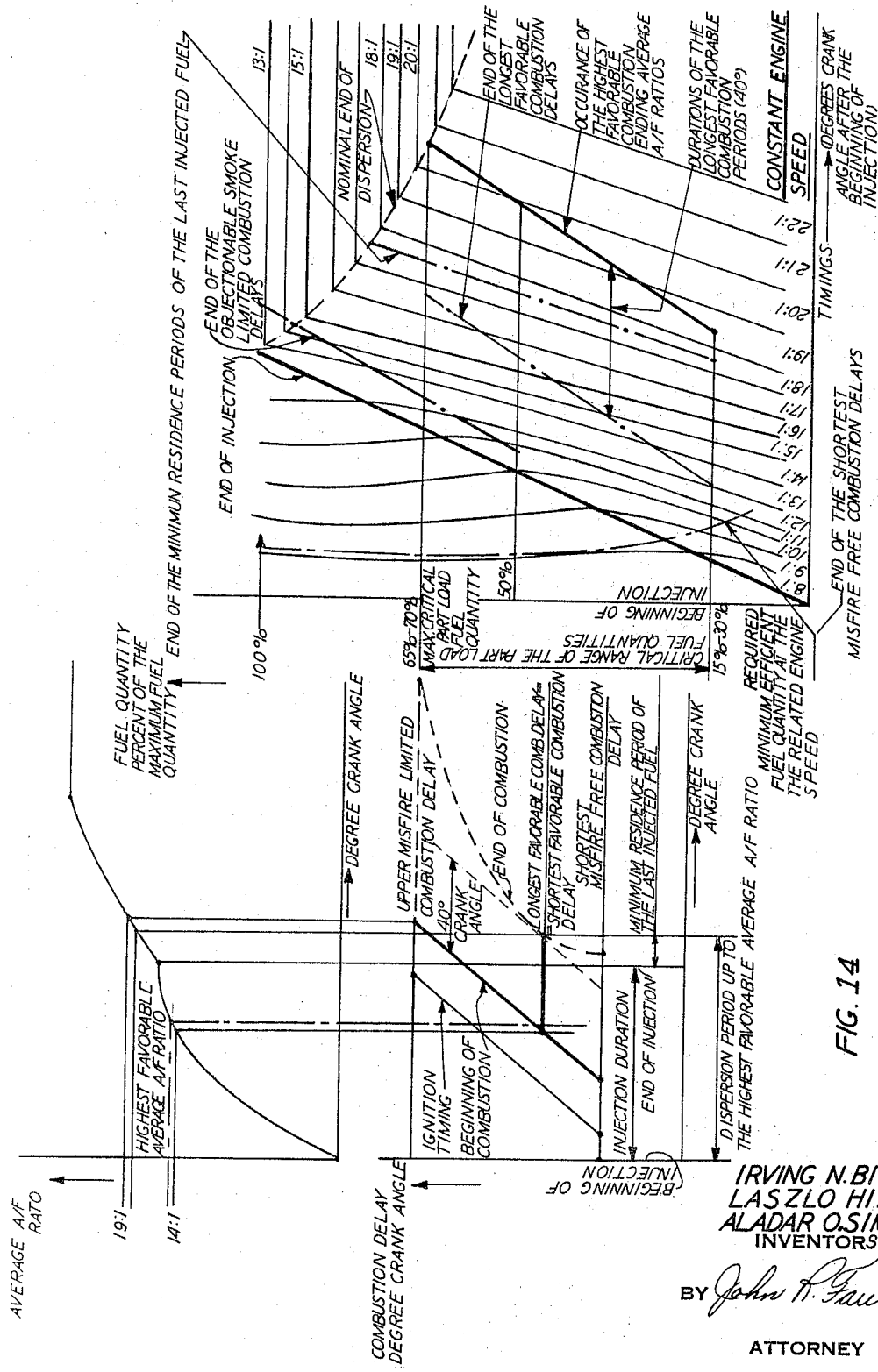

IRVING N. BISHOP
LASZLO HIDEG
ALADAR O. SIMKO
INVENTORS

3,315,650
INTERNAL COMBUSTION ENGINE COMBUSTION PROCESS

Irving N. Bishop, Farmington, Laszlo Hideg, Dearborn Heights, and Aladar O. Simko, Detroit, Mich., assignors to Ford Motor Company, Dearborn, Mich., a corporation of Delaware
Filed Sept. 17, 1965, Ser. No. 490,774
17 Claims. (Cl. 123—32)

This application is a continuation-in-part of our co-pending application, Ser. No. 268,760, filed Mar. 28, 1963.

This invention relates in general to an internal combustion engine. More particularly, it relates to a stratified charge combustion process for an internal combustion engine of the spark-ignition type in which fuel is burned in an excess of air at part loads and full utilization of the air is made at maximum loads.

It has long been recognized that in mixture cycle engines, that is, engines that burn a homogeneous mixture of fuel and air mixed outside the engine by a carburetor, for example, the part-load combustion efficiency is lower than optimum. This is due to a number of reasons.

For best engine efficiency, four-cycle, spark-ignition type engines must regulate combustion to occur when the piston is close to the top dead center position, and when the air-fuel ratios are within a narrow range of acceptable values. Hydrocarbon fuels, when suitably vaporized and mixed with air, burn at their highest rate only in a narrow range of air-fuel ratios. It is necessary, therefore, that the air-fuel ratio be controlled so that the mixture will burn at the highest practical combustion rates so that combustion will not be prolonged or occur too late in the expansion stroke.

When combustion is excessively long or slow, either the combustion pressure exerts a negative work on the piston as it rises during the compression stroke, or part of the heat energy is not converted into mechanical work until late in the expansion stroke, which produces a reduced expansion ratio and a reduction in maximum output power.

To maintain the air-fuel ratio in an acceptable range in a mixture cycle engine during combustion at part loads requires throttling not only of the fuel but also the air. This immediately results in a pumping loss during the piston suction stroke.

Another reason for the need for air-fuel ratio control, and, therefore, throttling in a mixture cycle engine, is that the use of gasoline necessitates spark ignition, which is essentially a point ignition. For satisfactory operation with point ignition, a suitable mixture must be present at the point and time ignition occurs not only at full load conditions, but also at all part-load conditions as well. The mixture must also be coherent and sufficiently rich in fuel to permit a smooth, rapid propagation of the flame from the point of ignition to the farthest regions of the mixture under all conditions; therefore, the mixture cannot be excessively lean or rich or ignition will not occur. As stated previously, therefore, the mixture cycle engine must be throttled to operate within a narrow range of air-fuel ratios at all times for satisfactory operation, which results in a pumping loss.

Another inefficiency of the mixture cycle part-load operation is that the temperature of the combustion products is excessively high. Since uniform mixtures are used, and since the air-fuel ratio of the mixtures cannot be substantially leaner than the chemically correct ratio, the heat energy of the fuel is utilized to heat a relatively small mass of gas. The temperature of the gas becomes high because the mass of gas is small compared to the quantity of heat liberated. Accordingly, the conversion of heat energy to mechanical work is accomplished with lower efficiency, and considerable heat is lost to the engine hardware.

A still further disadvantage of mixture cycle part-load operation is that it limits the compression ratio of an engine, and, therefore, lowers the expansion efficiency. In high compression engines, the unburned mixtures detonate when they are heated excessively by compression or other means, which can damage the engine parts by wiping away the protective boundary layer of gas at the cylinder walls. With uniform mixtures, there is no excess air to cool the unburned mixture below the self-ignition point, and, therefore, a lower compression ratio generally must be used.

The invention is directed to an internal combustion engine utilizing a stratified charge combustion process that permits operation of the engine with spark ignition, essentially without throttling, and without causing a quality reduction in any of the favorable characteristics of the known mixture cycle gasoline engines. Without throttling, the engine has substantial quantities of excess air at part loads. This cools the combustion products, causing an improved efficiency of the heat to mechanical energy conversion and a reduction in the heat rejection losses. Also, it results in a minimization of the pumping work losses. The process of the invention also controls the unthrottled operation so as not to cause prolonged combustion at part loads, deterioration in the maximum power output and fuel consumption, exhaust smoke, or an elevated unburned hydrocarbon concentration in the exhaust gas.

In essence, the invention is directed to a stratified charge combustion process providing for the induction of a gradually and continuously dispersing temporarily-localized mixture of air and fuel into the fresh air charge of the engine with a dispersion rate that is so slow that it permits ignition of the part-load mixtures at a single point and at a time when the fuel is sufficiently vaporized to assure misfire-free ignition and smoke-free combustion; and, permits an ignition delay period and the completion of the total combustion within a period no longer than that providing optimum performance. Also, the continuously dispersion mixtures are induced in the form of a single coherent and relatively compact volume, and are so induced that no more liquid fuel is deposited on the inside surfaces of the cylinders than is possible to vaporize and burn within the acceptable combustion period, and so that the localized dispersing mixtures do not move a substantial distance away from the fuel-wetted surfaces prior to the completion of the combustion.

Furthermore, the fuel concentration and the rate of dispersion of the localized mixtures are variable and are adjusted so that the rate of combustion is sufficiently slow during the combustion period that unacceptable combustion noise is avoided.

A primary object of the invention, therefore, is to operate an internal combustion engine of the spark-ignition type with a stratified charge combustion process whereby fuel is burned efficiently in an excess of air at part loads, and a full utilization of the air is made at maximum loads.

Another object of the invention is to provide a stratified charge combustion process that permits essentially unthrottled operation of an internal combustion engine at all speed and load levels.

A further object of the invention is to tune the fuel injection system of an engine to the cylinder air motion to provide slow dispersion of the air-fuel mixture into the air at such a rate that total combustion occurs in as short a period as will produce optimum engine performance without misfiring or producing objectionable smoke.

A still further object of the invention is to provide a stratified charge combustion process for an internal combustion engine whereby the pumping, heat and friction losses are minimized, and yet the engine hardware is as simplified as that used in conventional mixture cycle engines.

Another object of the invention is to provide a combustion process for an internal combustion engine that gradually and continuously changes the air-fuel ratio, and controls the changes in such a manner that sufficient delay is provided both before and after ignition of the mixture and before and after combustion that the total combustion occurs during a period in the compression and expansion strokes providing the least amount of losses while simultaneously providing optimum performance at all load and speed levels of the engine.

A still further object of the invention is to provide a method of operating an internal combustion engine in which fuel is injected into an excess of air at part loads in such a manner that the fuel slowly and gradually disperses into the air throughout the entire cycle of injection, ignition and combustion; and, the injection is at such low pressures and fuel particle velocities, rates of dispersion and fuel particle size, that the fuel has sufficient time to vaporize and form a uniform and coherent mixture that will provide optimum combustion duration and one occurring at a time providing optimum performance and operating efficiency of the engine.

It is a still further object of the invention to provide an internal combustion engine combustion process that includes: injecting fuel into an excess of air at part loads with such low fuel pressures and particle velocities and at such wide discharge angles and slow rates of dispersion of the fuel into the air that the air-fuel ratio will slowly increase until ignition of a localized mixture will occur without misfiring or producing smoke; and, the rates of dispersion of the fuel into the air are so slow that sufficient time will elapse for the development of sufficient fuel vapor to a point where total combustion will occur within the duration providing optimum engine operating efficiency and before the average air-fuel ratio of the mixture has reached an upper leaning limit prolonging the combustion period.

A still further object of the invention is to construct an internal combustion engine for use with a stratified charge combustion process whereby the existing cylinder air motion is modified by an air charge transfer motion during the compression stroke that is repeatable from cycle to cycle and cylinder to cylinder and promotes uniformity to the mixture and continues dispersion of the mixture into excess air with a minimizing of liquid fuel deposits on the cylinder surfaces to provide an optimum length combustion period without misfire or smoke.

Figure 16:
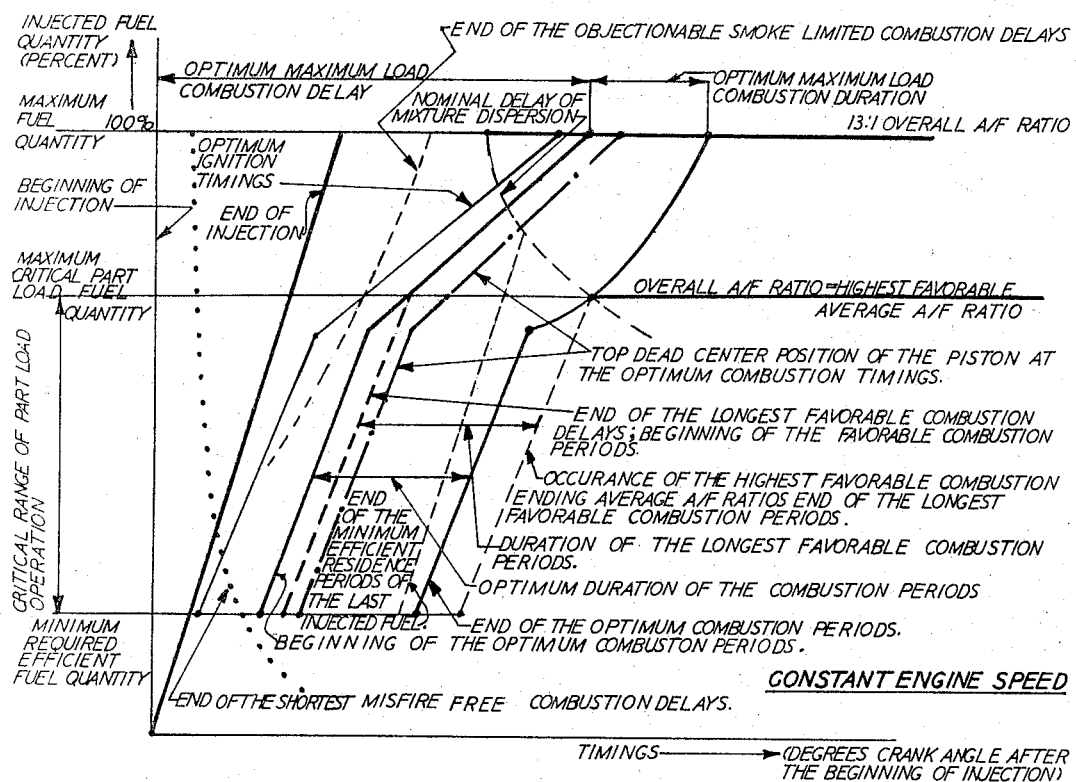
Figure 17:
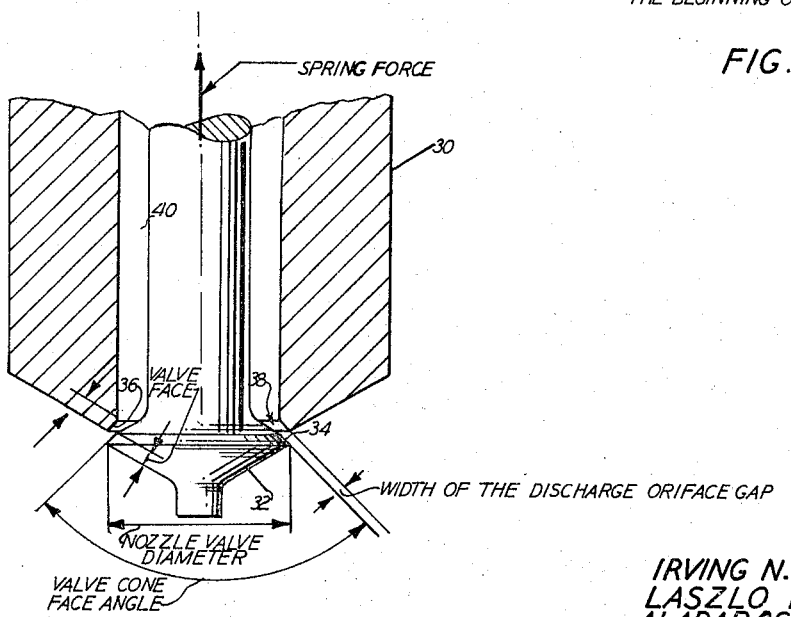

Other objects, features and advantages of the invention will become apparent upon reference to the succeeding, detailed description thereof, and to the drawings illustrating one internal combustion engine construction embodying the process of the invention; wherein, FIGURE 1 is a perspective view, with parts broken away and in section, of an engine cylinder constructed to utilize the process of the invention, and illustrating the initial phase of air induction;

FIGURES 2-7 are views similar to FIGURE 1 illustrating other operating conditions of the engine;

FIGURES 8-16 graphically illustrate the behavior of expanding fuel mixtures for particular fuel quantities with the passage of time in the engine of FIGURES 1-7; and, FIGURE 17 is a cross-sectional view of a fuel injection nozzle.

One of the primary objects of the invention is to provide a stratified charge combustion process for operation of an internal combustion engine that tunes the fuel injection equipment to the air motion and other conditions of the various engine designs. The process of our invention utilizes the inherent charge stratification produced by direct fuel injection. Let us first analyze what we believe occurs in a stratified charge engine at part and full loads, what requirements must be met for optimum performance and efficiency at all load and speed levels, and how the process of the invention satisfies these requirements.

In a stratified charge engine, only that portion of the air that is adjacent the spark plug is impregnated with gasoline or fuel at the time of ignition. As a result, light-load fuel quantities can be mixed with a small portion of the air so that the local air-fuel ratio around the spark plug is sufficiently high to permit reliable ignition, and yet a quantity of excess air may be present in the cylinder.

However, the process of charge stratification and reliable ignition in the presence of excess air does not automatically produce an improved net engine efficiency.

The most favorable combustion duration for an internal combustion engine of the four-cycle, spark-ignition type is less that approximately 40° crank angle rotation; that is, combustion should begin just slightly before the piston reaches top dead center position, say 5°, for example, and end after the piston has rotated approximately 35° past top center position. Prolonging combustion beyond either end of this range introduces efficiency losses which tend to nullify the gains attainable by the stratification. Therefore, if an engine is to operate efficiently at all load and speed levels, the total combustion period should not generally be longer than approximately 40° crank angle rotation, and should occur at the proper time relative to the position of the piston.

A primary requirement of the invention, therefore, is to control the fuel injection in such a manner that the rates of dispersion of the fuel into the air and the changes in air-fuel ratios will produce a total combustion that will always occur within approximately a 40° or less crank angle rotation range, and during the portion of the crankshaft rotation where the piston is in a position to provide the maximum obtainable power for that particular load level, and operate with maximum efficiency.

In order to obtain this short combustion duration, there are several requirements that must be satisfied. First, the dispersion of the localized mixtures must be slow. Acceptable combustion is obtainable generally only when the air-fuel ratios do not exceed approximately 21 to 1. It is not adequate, however, to insure that the air-fuel ratios of the localized mixtures are below this magnitude only at the time of ignition. In order to attain a suitably short combustion, the dispersion of the localized mixture into the excess air must be so slow that the average air-fuel ratios of the localized mixtures remain below thus limiting ratio during the ignition delay and the entire combustion period.

Secondly, the localized mixtures must be uniform to avoid prolonged combustion. They must not contain excessively rich and excessively lean portions. In excessively lean zones, the flame would propagate very slowly. In excessively rich zones, all of the fuel could not burn rapidly when the flame arrived because of lack of oxygen, and combustion would be prolonged until all the unburned fuel sufficiently mixed with fresh air.

Thirdly, the localized mixtures must be coherent and relatively compact. In a localized mixture consisting of several segregated mixture volumes, the propogation of the flame would be slow and uncertain from one segregated volume to the other. A localized mixture that had great length and excessively small cross section would tend to disperse rapidly and result in slow flame propagation and prolonged combustion.

Fourthly, no excess liquid fuel should be deposited on the inside surfaces of the engine when the localized mixtures are induced. In cases where the localized mixtures move away from the surface upon which liquid fuel is deposited, even a small quantity of the deposited fuel would be excessive. The localized mixtures would move away from the wetted surface, and the fuel vapors from the wall would diffuse into the fresh air forming a combustible mixture without an ignition source. In cases where the localized mixtures do not move away from the wetted surface substantially, a small quantity of deposited liquid fuel could be tolerated. However, this quantity must be no more than the quantity that can be vaporized by the combustion heat, mixed with oxygen, and burned during a non-prolonged combustion period.

In a commercially attractive stratified charge engine, it is not adequate to attain only an improved part-load efficiency. The engine must also match or exceed the other standards of the mixture cycle gasoline engines. That is, the stratified charge engine must not produce inferior maximum power output and fuel consumption, excessively harsh combustion, misfiring, exhaust smoke, or an increase of the unburned hydrocarbon concentration in the exhaust gas. Also, it must not require unreasonably expensive and overly sensitive control equipment.

The following additional requirements, therefore, must also be satisfied for producing improved efficiency: First, the fuel in the localized mixtures must be suitably vaporized prior to the combustion period to permit misfire-free and smoke-free combustion. Secondly, the air-fuel ratio of the localized mixtures and the rate of mixture dispersion must be controllable. This control is necessary to prevent excessively rapid combustion during a portion of the combustion period. In a mixture where the air-fuel ratio is very low during a substantial portion of the combustion period, combustion may be excessively rapid during a subsequent rich period, when sufficient vapor has formed to provide combustion, causing a loud combustion noise. Thirdly, the engine hardware that is required for the part-load stratified charge operation must not reduce the volumetric efficiency of the engine. This same hardware also should be suitable to induce the adequately uniform mixture at maximum loads to permit complete air utilization and maximum power.

A more detailed explanation as to why these requirements exist and how they are met by an engine utilizing the stratified charge combustion process of our invention will now be described.

One variable that affects fuel dispersion rates is the consistency of fuel sprays and air motion. There are two major characteristics of fuel sprays that are important for inducing efficient charge stratification in a given engine size. They are: (1) the penetration distances of the spray as a function of time, and (2) the change in the average air-fuel ratios in the spray-induced mixtures as a function of time.

The penetration distances of fuel sprays after the end of injection are, of course, a function of the injected fuel quantity, or the injection duration when a constant rate of injection is used. Obviously, the penetration distances are greater at higher fuel quantities. It will be clear that air motion in a direction other than that of the fuel spray will reduce the penetration distance, as will also an increase in air density, such as when injection is made late in the compression stroke.

It will also be clear that since fuel sprays disperse the fuel in a continuously increasing volume of air, a gradually dispersing air-fuel mixture is induced; also, since the mixture volumes in a fixed air density are proportional to the spray penetration distances, the mixture volumes at the end of injection are naturally greater when larger quantities of fuel are injected.

The average air-fuel ratio (hereinafter designated $A/F$ ratio) of the localized mixtures in gasoline engines is an important variable because it controls the burn rate and influences the rapidity of combustion in the mixtures. Let us therefore see what factors affect the changes in this $A/F$ ratio.

At any instant, the mixture average $A/F$ ratio is proportional to the volume of the mixture and the air density, and is inversely proportional to the instantaneous quantity of injected fuel. Increased air density reduces the mixture volume. However, because the quantity of air in the mixture continues to increase after the end of injection while the quantity of fuel does not change, the average $A/F$ ratio will increase.

Figure 8:
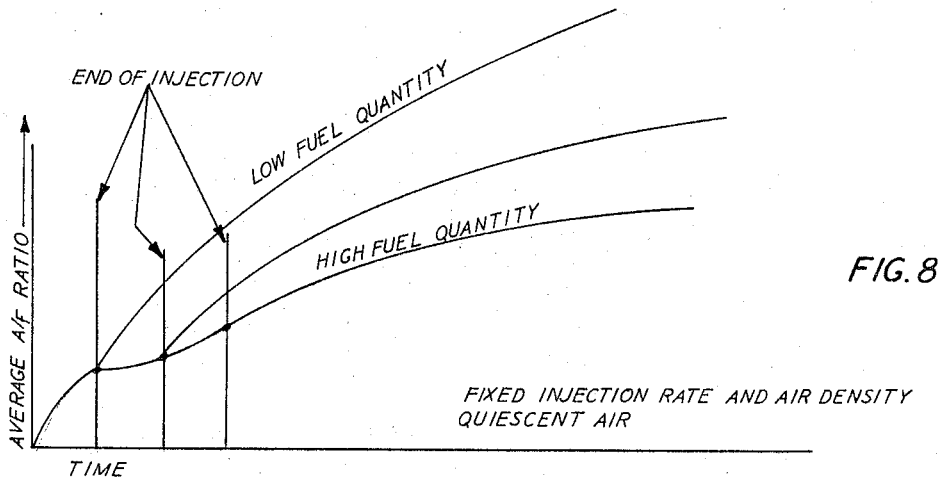

This is shown in the graph of FIGURE 8, where the changes in average $A/F$ ratio of the localized mixture vs. time for various quantities of injected fuel are illustrated. After the end of injection, the average $A/F$ ratio increases at a faster rate than during injection, primarily because thermal diffusion and diffusion induced by the turbulent condition of the air causes an additional volume increase of the mixtures. The average $A/F$ ratio increases faster when smaller fuel quantities are used, because the surface-to-volume ratio of the mixtures, to which the percentage volume increase is proportional, is higher.

The term "mixture dispersion" or "dispersion" will be used hereinafter to indicate the change in the average $A/F$ ratio vs. time characteristics of fuel spray-induced mixtures. The $A/F$ ratios are obviously higher at the same time after the beginning of injection in the case of a more rapid mixture dispersion than for a lesser rate mixture dispersion.

An increase in air motion also tends to raise the rate of increase of the mixture volumes and also the average $A/F$ ratios because of the greater dispersion; that is, air motion increase increases the small-scale turbulence and, therefore, the diffusion of the fuel to adjacent air layers.

Let us now consider in more detail the changes in average $A/F$ ratio with changes in fuel quantities and mixture dispersion rates. Consider a gasoline engine having a practical air motion pattern, air velocity, and combustion chamber design, a fixed engine speed and rate of injection. When fuel is injected into the cylinder bore during the compression stroke, the average $A/F$ ratio vs. time curves of the mixtures are similar to those shown in FIGURE 9, where the change in average $A/F$ ratio after injection ending is plotted as a function of the change in degrees of crank angle. The air motion and the changing air density alter only the average $A/F$ ratio and the time scale of the diagram; these factors do not substantially change the shape of the curves.

The entire load range of the engine is represented by the plot of a series of average $A/F$ ratio vs. time curves that correspond to a series of injected fuel quantities that cover the load range. In accordance with the FIGURE 8 curves, the smaller fuel quantity shows higher average $A/F$ ratios in the localized mixtures at the same time after the beginning of injection than the larger fuel quantity curves. The curves also indicate that, for each fuel quantity, the average $A/F$ ratio increases only up to the point designated as the nominal end of dispersion, which is the point when the fuel becomes dispersed into all portions of the air charge. Past this point, the average $A/F$ ratios will, therefore, not increase. At the nominal end of dispersion, the fuel, however, is not necessarily uniformly dispersed throughout the charge. A further time period must elapse before complete charge uniformity is produced by diffusion and mixing.

As shown, the nominal end of dispersion is reached earlier in the case of larger injected fuel quantities because the air is not as dense due to earlier injection, and, therefore, the fuel penetration is greater. Also, the nominal end of dispersion usually does not occur until after the end of injection, even in the case of the maximum injected fuel quantity, since sufficient time must be provided even at maximum loads for the fuel to vaporize before efficient short combustion can occur.

Figure 10:
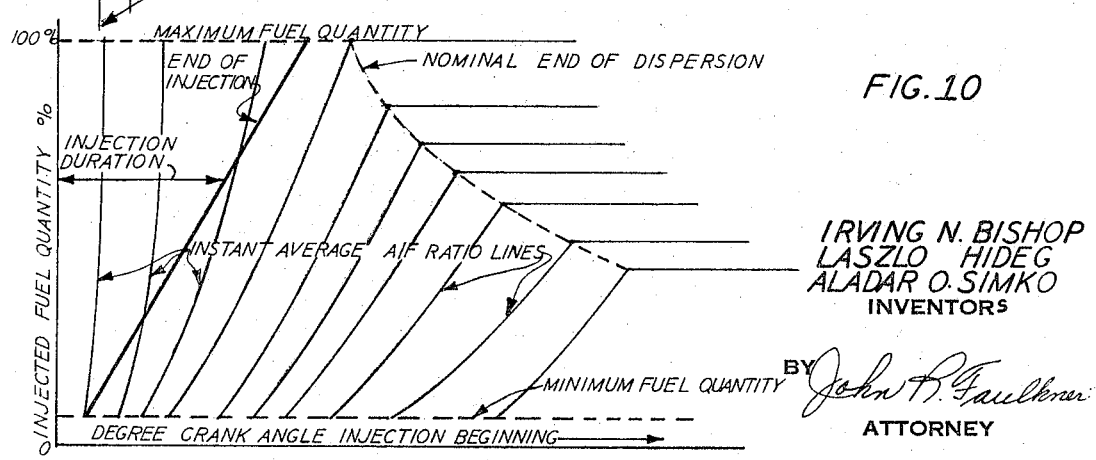

The above information can also be represented graphically in a different manner, shown in FIGURE 10, where the timing and duration of various events in the engine cylinder vary as a function of the percentage of fuel quantity injected and degrees of crank angle rotation. FIGURE 10 represents the changes that occur in the average $A/F$ ratios with time for a gradually dispersing localized mixture.

Assuming a fixed engine speed and injection rate, injection begins at the zero degree point of the timing scale in FIGURE 10, and ends at a point on a straight oblique line that intersects the origin. Each of the curves represents the time it takes from the beginning of injection for the mixture to reach a certain average $A/F$ ratio, the lines at the left representing richer mixtures, or lower $A/F$ ratios. These lines are constructed by cross-plotting from FIGURE 9.

Figure 9:
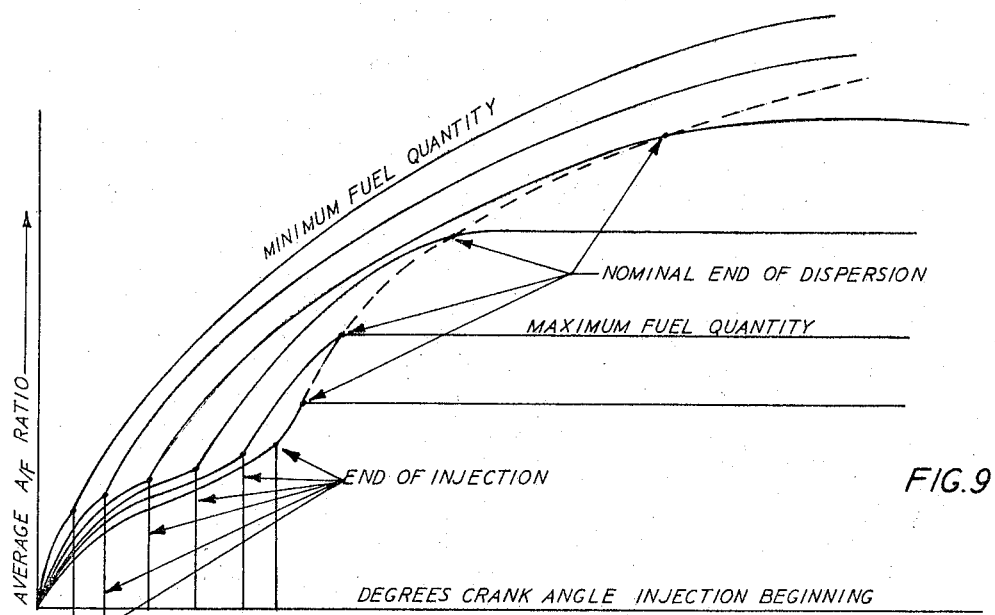

As in FIGURE 9, the average $A/F$ ratio lines become horizontal after the nominal end of dispersion is reached. When this point is reached, the average $A/F$ ratio of the localized mixture is equal to the over-all $A/F$ ratio of the contents of the engine cylinder. In a substantially unthrottled engine, the over-all $A/F$ ratios will obviously vary for different quantities of injected fuel.

The timing of the beginning of injection for a given fuel quantity so that the expanding localized mixture will arrive at a predetermined average $A/F$ ratio at the correct time is one of the important factors of the invention.

As stated previously, in order to obtain optimum engine efficiency, the heat of combustion must be liberated when the piston is near top dead center position. Acceptable engine efficiency is obtained when combustion is accomplished between approximately 5° before top dead center and 35° after top center positions of the crankshaft at medium engine speeds. The duration of the heat liberation period, therefore, should be shorter than 40° crank angle rotation at medium engine speeds. A substantial prolongation of the combustion beyond this limit significantly reduces engine efficiency because of the increased losses previously described.

As also stated previously, in stratified charge engines, the average $A/F$ ratios of part-load mixtures slowly and continuously increase because the mixture continuously disperses into an increasing portion of the air charge. When the mixture is ignited, combustion does not markedly change the rate of dispersion of the mixture. The $A/F$ ratios in the unburned part of the mixture continue to increase during combustion at approximately the same rate as if the mixture were not ignited.

Initiated by the spark, a flame front develops that propagates through the mixture gradually consuming its entire mass. The velocity of the flame, or the maximum burning rate of combustion occurs at approximately 12:1 $A/F$ ratio, and is near maximum between approximately 8:1 and 21:1 $A/F$ ratios. Combustion rates are substantially reduced at higher $A/F$ ratios. Consequently, the duration of the combustion period is near minimum when the $A/F$ ratio of the mixture is between 8:1 and 21:1 $A/F$ ratios. $A/F$ ratios outside of these limits susbstantially prolong the combustion duration.

It follows that the $A/F$ ratio of the mixture must be suitably low; i.e., the burn rate and rate of dispersion must be such, to permit shorter than 40° crank angle combustion duration.

Figure 11:
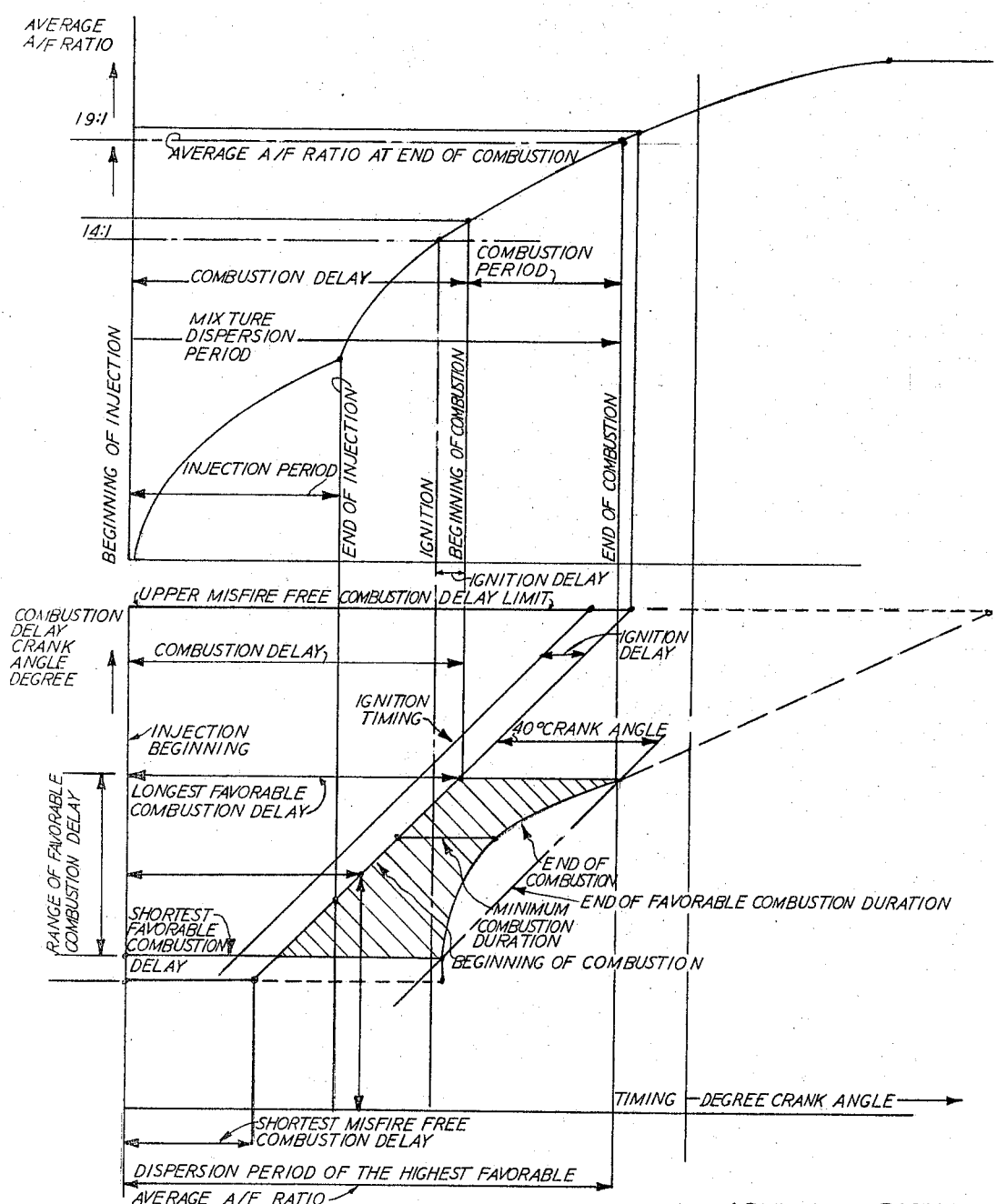

In order to properly evaluate what are the limits insofar as short combustion duration and optimum part-load efficiency is concerned, consider now the cycle of injection, ignition and combustion of a fixed quantity of fuel such as would be injected at medium load conditions, for example. This is shown in FIGURE 11, where the upper portion shows changes in average $A/F$ ratio with changes in the crank angle. Assume that the rate of dispersion is fixed and is optimum so that a slow, gradual dispersion of the fuel occurs that will result in optimum short combustion duration. Assume also that fuel is injected directly into the cylinder; the rate of injection is constant at a constant engine speed and is proportional to engine speed; the cylinder is not throttled; the air motion pattern is a type commonly used in the internal combustion engines; the velocity of air motion is not extremely high and is proportional to the engine speed; and the spark gap is located a distance away from the nozzle tip and in the path of the fuel particles under all operating conditions of the engine. For the purposes of explanation, the time period between the beginning of injection and the beginning of rapid combustion is referred to as the "combustion delay." The time period between the occurrence of the spark and the beginning of rapid combustion is called the "ignition delay" period. It is during this period that a stable flame core develops. The time period between the beginning of rapid combustion of the mixture and the end of the combustion is referred to as the "combustion duration." The time period between the beginning of injection and the end of combustion is referred to as the "mixture dispersion period."

Referring to the upper part of FIGURE 11, when this fixed part-load fuel quantity is injected into the engine cylinder during the compression stroke, the injector nozzle design (to be described later) assures the desired continuously dispersing and temporarily localized air-fuel mixture having a continuously increasing average $A/F$ ratio, as shown. In this particular mixture, with a fixed optimum dispersion rate, the 14:1 average $A/F$ ratio, which is essentially the chemically correct ratio, is reached after the end of injection. If ignition did not occur, the increase in the average $A/F$ ratio would continue up to the time when the mixture volume would be dispersed to the total volume of the cylinder charge, which would result in an extremely high over-all ratio.

Upon ignition, an ignition delay period then occurs during which a flame core develops. By the end of the ignition delay period, the flame core is sufficiently large to rapidly propagate a flame through the mixture. At this time, rapid combustion begins and the pressure in the cylinder rises rapidly. Complete combustion then occurs, the ending of combustion usually being simultaneous with the total mixture inflammation.

It is assumed that the timing of the combustion period relative to the top dead center position of the piston is always optimized, and that the ignition always occurs at an appropriate time prior to the beginning of the rapid combustion. Increasing the combustion delay means beginning injection earlier relative to the top dead center position of the piston.

The ignition delay is an important variable. However, from the point of view of the engine efficiency, it is not as important as combustion delay and combustion duration. It is important to determine the correct conditions for efficient combustion in terms of combustion delay rather than in the terms of both ignition timing and ignition delay. It will be clear, however, that the desired combustion delay is attained by adjusting ignition timing.

The duration of combustion in the part-load dispersing mixture illustrated in FIGURE 11 is varied by using various combustion delays. That is, by initiating combustion earlier, the $A/F$ ratio is lower, the burn rate higher, and, therefore, combustion duration will vary.

The shortest and longest combustion durations that can be attained at various combustion delays are shown on the lower part of FIGURE 11, and the upper and lower portions of the figure are used to show both the average $A/F$ ratios during combustion and the combustion duration at various combustion delays. On the lower portion, the vertical axis represents combustion delays, and the horizontal axis represents the time of the various points in the engine cycle after the beginning of injection. The beginning of combustion is represented by a straight 45° line that intersects the origin of the diagram. Each point of this line is an equal distance from both axes because the combustion delay is numerically equal to the time period between the beginning of injection and the beginning of combustion. The end of combustion is represented by the curve so legended. The horizontal distance between the line of combustion beginning and the curve of combustion ending represents the combustion duration. A horizontal section through the diagram, therefore, shows the times of combustion beginning and ending and the combustion duration at any given combustion delay. The dotted line that is parallel to the line indicating beginning of combustion represents the 40° crank angle between the two lines within which combustion must be completed for maximum engine efficiency.

The upper portion of FIGURE 11 serves to show the average $A/F$ ratio of the mixture at the beginning and end of the combustion. By projecting the points of the combustion beginning and ending up to the average $A/F$ ratio vs. crank angle curve, the $A/F$ ratio can be read on the vertical axis of the upper diagram.

A line, nearly parallel with the combustion beginning line indicates the ignition timing at the various combustion delays. The horizontal distances between the lines of the ignition timing and the beginning of combustion represent the ignition delays at various combustion delays.

As shown on FIGURE 11, one of the limitations as to the length of combustion delay available for producing short combustion is the misfire-free limits. Combustion of the mixture without misfire can be obtained only within a range of combustion delays between predetermined lower and upper limits. At combustion delays shorter than the lower limit, the engine misfires because insufficient time has elapsed for sufficient fuel vapor to diffuse from the liquid droplets to support the development of a stable flame core. The lower combustion delay misfire-free limit is, therefore, the vaporization time minimum for a misfire-free combustion beginning. A combustion delays longer than the upper limit, the engine misfires because the delay has caused the continuing dispersion of the fuel into the air to make the $A/F$ ratio of the mixture too high (mixture too lean) to permit a stable flame core development. The upper combustion delay misfire-free limit is, therefore, the longest delay for this particular fuel dispersion rate that will permit a misfire-free combustion beginning.

It will be seen that the combustion duration of this particular dispersing mixture is shortest when the combustion begins at slightly lower than 14:1 A/F ratio and ends at a slightly higher value. That is, the burn rate and its change is best during this period, and, therefore, will consume the total fuel quantity in the shortest time, and less than 40° crank angle. The combustion delay that produces this shortest combustion period is designated as the "combustion delay for minimum combustion duration." When either shorter or longer combustion delays are used, combustion durations become longer. At the shorter combustion delays shown, the mixture burns when it is excessively rich in fuel. Although the burn rate is faster, and the flame runs through the entire mixture faster, the flame cannot cause the combustion of the total fuel quantity in the mixture because there is an absence of sufficient oxygen. The combustion, therefore, continues after the flame reaches every point of the mixture until the burning mixture further disperses sufficiently so that all the fuel finds oxygen, which prolongs combustion beyond the chemically correct 14:1 magnitude.

At longer combustion delays, the combustion period becomes extended because the higher average $A/F$ ratios and excess air tends to reduce the combustion temperature and the burning rate during the entire combustion period, compared to the burning rate at the minimum combustion duration. The burning rates in slightly fuel-lean mixtures, however, are substantially more uniform through the combustion period than that in the overly rich mixtures because the oxygen is sufficient to permit a nearly instantaneous and complete burning of the fuel upon the flame arrival at the first portion of the combustion as well as at the latter portion.

In the continuously expanding part-load mixture illustrated in FIGURE 11, favorable combustion durations shorter than the 40° limit for optimum efficiency can, therefore, be attained within a range of combustion delays between the lower and upper combustion delay limits shown. The optimum combustion duration will be the one that represents a correct balance between the combustion efficiency and the combustion noise for a particular engine.

In engines where air charge turbulence is intense and the structure of the engine is such that it causes an unreasonable engine noise without resulting in a better efficiency than a somewhat longer combustion, the minimum combustion duration will be substantially shorter than 40° crank angle rotation. Operation in the short combustion delay range, however, usually results in unreasonably noisy combustion.

In the case illustrated in FIGURE 11, the engine structure, the turbulence of the air charge, spatial heterogeneity of the dispersing mixture, and the compactness of the mixture are normal. Under these conditions, the optimum combustion duration is less than 40° crank angle rotation. Since 40° crank angle combustion duration is attained with the combustion ending $A/F$ ratio is approximately 19:1, it can be stated that under the assumed conditions, the optimum combustion duration is possible because the expanding mixture can be ignited without misfiring so that the combustion begins more than 40° crank angle rotation prior to the time when the 19:1 average $A/F$ ratio would be reached in the non-ignited mixture. In other words, the dispersion period is longer that the sum of the shortest combustion delay misfire-free limit and 40° crank angle rotation.

In some cases where the fuel is not sufficiently well atomized and the mixture dispersion is very rapid, a substantial quantity of vapor will develop only when the average $A/F$ ratio of the mixture is already high. The burn rate is, therefore, lower, and it now takes longer to burn the same total quantity of fuel. In these cases, the upper and lower combustion delay limits shown in FIGURE 11, therefore, will be very close to each other, and the range of misfire-free combustion delay may be extremely narrow.

The above optimum condition of the dispersing mixture, however, is for one fuel spray with the optimum low dispersion rate that the process of the invention utilizes. This cannot be produced in the same engine with all fuel sprays under all conditions; that is, fuel sprays that provide more rapid rates of dispersion. The limits of acceptable mixture introduction; that is, the limits for the mixture dispersion rates, will now be discussed.

*The maximum favorable misfire-free mixture dispersion rate*

One adverse condition that is caused by improperly tuned fuel injection equipment is too rapid mixture dispersion. The harmful effect of this rapid dispersion appears first at the lowest engine loads where dispersion is always more rapid because of the surface-to-volume ratio of the mixture.

When the dispersion of the expanding mixture is more rapid than that represented by the expanding mixture in FIGURE 11, the total dispersion period during which the 19:1 average $A/F$ ratio is reached naturally becomes shorter. Since, however, the longest favorable combustion duration still remains 40°, combustion must be initiated earlier, and the longest favorable combustion delay, therefore, decreases. However, the lower combustion delay misfire-free limit does not change substantially. At some high mixture dispersion rate, therefore, the dispersion period becomes so short that the longest favorable combustion delay is as short as the lower combustion delay misfire-free limit, and the favorable combustion delay becomes a single value. This condition is shown in FIGURE 12. Consequently, shorter combustion than 40° crank angle cannot be attained without misfiring because insufficient fuel vapor has diffused from the fuel droplets to support a stable ignition. FIGURE 12, therefore, represents the maximum favorable mixture dispersion rate.

The magnitude of the lower combustion delay misfire-free limit, of course, depends upon the fineness of fuel atomization and the ignition system. It may vary between 10° and 40° crank angle rotation.

*The maximum favorable smoke-free mixture dispersion rate*

Another limitation on the rapidity of mixture dispersion rate is that it must not produce visible smoke during combustion. In some applications of the stratified charge gasoline engines, only visible exhaust smoke must be avoided. In other applications, it may be desirable to eliminate all solid carbon particles from the exhaust gases under all operating conditions. Therefore, the objectionable quantity of the solid carbon depends upon the standards set for the particular application of the engine.

Usually at medium loads, the rapidity of mixture dispersion is limited as well as at light loads, but generally for a different reason. When combustion is initiated too soon after the beginning of injection, the latest injected liquid fuel particles are heated at an excessive rate by the combustion heat. The liquid fuel droplets in the spray vaporize and form local pockets of extremely rich air-fuel vapor. Since there is insufficient oxygen in these areas, a part of the fuel breaks down into carbon and hydrogen instead of burning inside the rich spots. This process results in the formation of solid carbon particles that are exhausted as smoke. The process of the invention minimizes the formation of exhaust smoke by initiating the combustion after a suitable preheating and vaporization period.

The preheating and vaporization period required depends primarily upon the fineness of the fuel atomization and the rate of injection. Therefore, it will vary with different fuel injection systems. The preheating and vaporization period prior to combustion is indicated hereinafter as the shortest combustion delay providing smoke-free combustion.

At light loads and low fuel quantities, when misfiring is successfully avoided, the quantity of solid carbon emission is usually negligible. That is, smoke may be present, but is not visible smoke. However, at medium and high loads, it is possible to form an excessive quantity of solid carbon even though there is no misfiring. Consequently, at these loads, it is the quantity of the acceptable solid carbon emission that determines the maximum useful mixture dispersion rate, rather than misfiring.

When low injection rates are used, such as described in connection with FIGURE 11, the preheating and vaporization period prior to combustion at medium and high loads is usually slightly longer than the injection duration.

The smoke-limited combustion delay represents a similar limitation on mixture dispersion rate as the misfire-limited combustion delay. In cases when the mixture dispersion is slow for a given fuel quantity, the longest favorable combustion delay is longer than the smoke-limited combustion delay. In these cases, a certain range of favorable combustion delay exists within which combustion duration shorter than 40° crank ang'e rotation can be attained without excessive exhaust smoke. The most rapid permissible mixture dispersion rate insofar as smokeless combustion is concerned, therefore, is one where the combustion delay is no shorter than the delay providing smoke-free combustion. A faster mixture dispersion would necessitate starting combustion earlier, and then even the 40° crank angle combustion duration could not be attained without excessive exhaust smoke.

Therefore, it can be stated that maximum mixture dispersion rate permittting smoke-free combustion is one where the dispersion period up to the highest favorable average $A/F$ ratio (approximately 19:1) is equal to the sum of the shortest combustion delay giving smoke-free combustion and the longest favorable combustion duration (approximately 40° crank angle). This is shown in FIGURE 13.

*The mixture dispersion rate as limited by the consistency of the mixture during combustion*

In some engines operating with given fuel injection systems, the use of relatively slow injection may be necessary in order to avoid either misfiring or objectionable exhaust smoke. However, in these cases, the maximum useful mixture dispersion rate, however, may also be limited by the need for completion of the formation of the mixture. The reason for this limitation is that combustion cannot end prior to the end of injection or simultaneously with the end of injection because the last injected fuel must have time to vaporize, mix with air, and be oxidized.

When mixture dispersion is slow, the dispersion period up to the 19:1 highest average $A/F$ ratio can be longer than the sum of both the injection duration and the minimum period in which the last injected fuel can vaporize, mixed with air and be oxidized. The highest mixture dispersion rate is one where the 40° combustion period ends at the same point as the minimum residence period of the last injected fuel. That is, the highest dispersion rate is one where the delay between end of injection of the last injected fuel and the burning of it is sufficient to cause it to be so well mixed by the time the last of the initially injected fuel burns that the last injected fuel will also burn at the same time, and combustion will end within 40° crank angle. In the case shown in FIGURE 14, the combustion duration is 40° when the longest favorable combustion delay is used because it is possible to vaporize and mix the last injected fuel and complete its combustion simultaneously with the end of the 40° combustion period. When shorter combustion delays are used, the burning rate in the earlier injected portion of the mixture increases. However, the combustion cannot end within 40° because the burning rate is reduced in the later injected portion of the mixture due to the lack of sufficient vaporization and sufficient locally available oxygen. The combustion, therefore, becomes prolonged until the entire fuel quantity can find oxygen. Under this condition, the useful combustion delay is a single value. If the mixture dispersion rate were higher, no combustion delay producing a 40° crank angle combustion duration would exist because the change in $A/F$ ratios would be faster, less fuel would be consumed per change in $A/F$ ratio than previously, and so combustion would have to continue beyond the 40° maximum until all the fuel were consumed.

FIGURE 14 represents the maximum favorable mixture dispersion rate for proper mixture formation. It is clear, therefore, that the maximum mixture dispersion rate insofar as mixture formation is concerned is one where the dispersion period up to the highest favorable $A/F$ ratio of the mixtures (approximately 19:1) is as long as the sum of the injection duration and the minimum period in which the last injected fuel can vaporize, mix with air, and burn.

The usual magnitude of the minimum residence period of the last injected fuel is greater than 15° crank angle rotation.

*Tuning the fuel injection system to avoid excessively rapid mixture dispersion*

It is clear from the above that the mixture dispersion must be suitably slow in order to make possible the completion of combustion during a satisfactory short period of time without misfiring and exhaust smoke.

To avoid excessively rapid mixture dispersion, therefore, the process of the invention provides for tuning the fuel injection system to the motion and turbulence of the air charge. This tuning involves a combination of initial fuel discharge velocity, rate of fuel injection, spray cone angle, and fuel discharge orifice shape, size, and other fuel nozzle design factors. The resultant combination is such that at all part loads and all normally used engine speeds the volume of the fuel spray-induced mixtures contain a quantity of air within the mixture giving a favorable average $A/F$ ratio up to approximately 19:1 during a period exceeding the longest of three critical limiting periods: (1) the sum of the shortest misfire-free combustion delay (varies between 10° and 40° crank angles) and the longest favorable combustion duration (approximately 40° crank angle); (2) the sum of the shortest smoke-free combustion delay (approximately 10° crank angle longer than the injection duration) and the longest favorable combustion duration; and (3) the sum of the injection duration and the minimum residence period of the last injected fuel (longer than 15° crank angle).

In other words, a correct tuning of the fuel injection system for slow dispersion permits completion of combustion during the rich portion of the mixture dispersion period and in as short a period as will produce optimum performance and efficiency without misfiring or objectionable exhaust smoke at all engine speeds and at low to medium loads.

The factors that influence mixture dispersion requirements, of course, differ from one engine and injection design to another. These vary as a function of the engine load and speed and are determined by means of engine tests.

The correct tuning for sufficiently slow mixture dispersion in an engine at one engine speed is demonstrated in FIGURE 15.

In FIGURE 15, there are shown the end points for the shortest misfire-free and smoke-free combustion delays, the minimum vaporization and combustion periods of the last injected fuel, and the time the highest favorable $A/F$ ratio is reached. The occurrence of the highest $A/F$ ratio at each fuel quantity is found experimentally in the stratified charge engines. The highest favorable $A/F$ ratio is shown with load. The highest favorable $A/F$ ratio will, of course, vary as a function of the intensity of the air charge turbulence, air temperature, spatial heterogeneity of the mixtures, and the fuel type. The end of the highest favorable combustion delay is also indicated. Obviously, the horizontal distance between this line and the highest $A/F$ ratio line represents the combustion period.

The lines of longest combustion delays and the highest $A/F$ ratios are shown only in a range of fuel quantities designated as critical. Above this range, the proportion of fuel to the total volume of air is such that an excessive $A/F$ ratio will never be reached; therefore, the mixture will not exceed the maximum favorable 19 or 20:1 $A/F$ ratio at any time prior to combustion beginning. At the maximum critical fuel quantity, the highest average $A/F$ ratio at the end of combustion is equal to the over-all $A/F$ ratio of the charge. Therefore, the combustion durations cannot be prolonged by excessively long combustion delays. The maximum critical fuel quantity is approximately between 65% and 70% of the maximum fuel quantity.

The lower limit of the critical range fuel quantity is the minimum at which optimum engine efficiency is required. In automotive engines in the full-speed range, the required minimum is approximately between 15% and 30% of the maximum fuel quantity over the speed range.

The maximum fuel quantity results in approximately a 13:1 over-all $A/F$ ratio mixture.

The tuning, represented by FIGURE 15, for sufficiently slow mixture dispersion, is correct because, in the entire critical range of fuel quantities, short 40° or less combustion duration can be attained without either misfiring or objectionable exhaust smoke. A range of favorable combustion delays exists between the longest favorable combustion delay and the smoke-limited combustion delay (at the higher part loads) or the shortest misfire-limited combustion delay (at the lowest loads). At medium part loads, a range of favorable combustion delays exists because the end of combustion can be retarded from the time the highest favorable $A/F$ ratios occur up to the end of the minimum period for vaporization and burning of the last injected fuel. Ranges of favorable combustion delays exist because the fuel system is so tuned that in the entire critical range of the part-load fuel quantities, the dispersion periods, up to the point of time when the highest favorable $A/F$ ratios are reached, are longer than either the sum of the shortest combustion delays providing misfire-free combustion and the longest favorable combustion duration (40°), or the sum of the injection durations and the minimum vaporization and burning periods of the last injected fuel.

The fuel injection system of the invention, to be described, provides a fuel spray that meets these conditions; therefore, the engine will be properly tuned for optimum performance and efficiency in the entire speed range of the engine.

*Combustion at maximum loads*

It is also the purpose of the invention to assure that all of the air that is available in the cylinder finds fuel at maximum loads with the same fuel injection equipment required to produce efficient part-load combustion.

In order to attain the desired complete air utilization, the maximum load mixtures must be suitably uniform during combustion.

Complete air utilization must be attained with an approximate 13:1 over-all $A/F$ ratio. Some degree of mixture heterogeneity is permissible, and it can be advantageous. Slight differences between local $A/F$ ratio regions within the mixture are equalized by intensified thermal and turbulent diffusion during the combustion period. This mixing process can be used to reduce the burning rate and to lengthen the combustion duration when desirable. However, when maximum-load mixture heterogeneity is excessive, engine efficiency is reduced.

By suitable combustion delays at the maximum injected fuel quantities, the process of the invention permits maximum-load operation without excessive prolongation of maximum-load combustion and the necessity of substantially higher maximum-load $A/F$ ratios than those used in mixture cycle engines.

The fuel injection system, which is correctly tuned to permit sufficiently slow mixture dispersion in the critical part-load range, produces a gradually dispersing mixture at all loads, and disperses during injection as well as after injection. It is not possible to complete combustion of maximum-load mixtures prior to the nominal end of dispersion because the maximum-load over-all $A/F$ ratio is richer than the 12:1 chemically correct ratio. Actually, the combustion continues until the excess fuel can find fresh air. Rarely can combustion end simultaneously with the nominal end of dispersion because the leanest portions of the mixture usually do not contain sufficient quantities of fuel to provide for complete air utilization by the nominal end of the dispersion.

Combustion periods that end after the nominal end of dispersion are shorter because fuel distribution equalization can take place during a shorter time period. Combustion may end at such late time after the beginning of injection that the mixture becomes nearly as uniform and well vaporized as the mixture that can be induced in the same engine with a carburetor. In this case, the combustion duration will be the shortest possible.

In various engine designs, due to the pecularities of manufacture, the shortest possible maximum-load combustion duration may not be optimum because of the harshness of combustion; equally high power output and engine efficiency may, therefore, be attainable. The combustion delay producing the optimum maximum-load combustion duration is hereinafter the optimum maximum-load combustion delay.

At maximum engine loads and at all engine speeds, therefore, the mixture control method process of the invention uses injection timings that result in maximum load combustion delays sufficiently long to induce a nearly uniform mixture during the combustion period.

Excessively slow mixture dispersions, however, do not automatically permit long maximum load combustion delays. The injection cannot begin prior to the beginning of the intake stroke; therefore, the mixture dispersion is too slow when an injection beginning at the beginning of the intake stroke does not provide the suitably uniform maximum-load mixtures by the time of combustion.

In order to avoid such an excessively slow mixture dispersion, the process of the invention uses such a tuning of the fuel injection system that the maximum load mixtures at all engine speeds are sufficiently uniform to produce optimum engine power with good efficiency, with combustion delays shorter than the entire intake and compression stroke of the engine.

*Depositing of liquid fuel*

As stated earlier, one of the requirements for short combustion duration is that the depositing of liquid fuel on the cylinder surfaces be maintained at a minimum so that no combustible mixtures are present without an ignition source, and, therefore, the expanding mixture will be a coherent and compact one.

The depositing of liquid fuel on the cylinder surfaces occurs mainly because the fuel is discharged from the fuel nozzles in liquid form, and the liquid fuel droplets formed in the spray attain relatively high initial velocities. When either the initial velocity of the fuel droplets is excessively high or the deceleration of the fuel droplets in the air is excessively low, a large number of the liquid fuel droplets reach the cylinder wall before the droplets completely vaporize or combustion is completed.

The practical method for controlling the quantity of the deposited liquid fuel is tuning of the fuel injection system to the cylinder size, combustion chamber dimensions, and the air motion patterns and velocities of the various engine designs. The necessary tuning for an effective reduction of the deposited liquid fuel quantity involves the use of a sufficiently low fuel discharge velocity from the nozzle and a sufficiently wide spray cone angle coupled with a sufficiently high fuel droplet deceleration in the air or reduced spray tip penetration.

With large spray cone angles, the kinetic energy of the fuel droplets is dissipated into a relatively large mass of air immediately after the droplets enter, resulting in a relatively slow spray air current. In these slow spray air currents, the deceleration of the fuel droplets is high and the spray tip motion is relatively slow. In addition, wide cone angle fuel sprays distribute any deposited liquid fuel on a relatively large surface and promote a rapid rate of evaporation.

*The mixture control process of our invention*

Having described the various limitations on mixture dispersion rates, and the various other requirements for short combustion with stratification, we now will briefly review the over-all process to completely satisfy the initial requirements for efficient stratification with a short combustion duration. In practice, as stated previously, the combustion durations are varied by varying the ignition timings relative to the beginning of injecton.

For optimum engine efficiency, not only the optimum combustion duration must be adjusted, but also the timing of the combustion period must be optimum relative to the top dead center position of the piston. Thus, the mixture-control method of the invention provides for both optimum adjustment of ignition timing after the beginning of the injection and optimum adjustment of the injection beginnings in advance of the top dead center position of the piston to attain the combustion timings in the engine cycle which produce the optimum engine efficiency.

An illustrative optimum timing schedule for use throughout the entire load range at a constant engine speed is shown in FIGURE 16. This diagram is similar to the one shown in FIGURE 15, with additions of the lines indicating the end of the optimum combustion delays (beginning of the optimum combustion period), and the end of the optimum combustion period which produced the highest engine efficiency with the least combustion noise in the critical part-load range. The ignition timings that produce the optimum combustion delays are also shown. Top dead center position of the piston is shown by a phantom line slightly after the beginning of the optimum combustion periods. The displacement of the combustion periods relative to the top dead center line represents the timing of the combustion periods in the engine cycle that produce the highest engine efficiency. The horizontal distances between the top dead center line and the combustion beginning may be called the optimum combustion advances. The horizontal distances between the top dead center line and the line of the ignition timings and the line of the injection beginnings are designated as the optimum ignition advance and the optimum injection advance, respectively.

In order to attain the required complete and efficient air utilization at 100% fuel, the process uses the optimum maximum-load combustion delay. On the 100% fuel line of FIGURE 16, the end of the optimum maximum-load combustion delay, duration, and the optimum timing of the top dead center position of the piston, and the optimum ignition timing are represented by single points. It is understood that the optimum maximum load combustion delay is suitably shorter than the entire intake and compression stroke.

Between the critical part-load range, where excess air is present, and the maximum load, a transitional timing schedule is used to establish a smooth transformation between the timing requirements for the two. A simple gradual increase of combustion delays from optimum at part load to optimum at maximum load is usually suitable, as is seen in the figure. The gradual increase of combustion delays in the transitional load range is attained by a linear change of injection advance as a function of fuel quantity. Similarly, a linear change in ignition timing in the transitional load range is shown.

A nearly linear transition of the top dead center position and the ignition timing results in combustion duration and combustion timing which produce nearly the optimum engine efficiency in the transitional load range. However, a deviation from the linear transitions can be provided, if necessary, to attain improved engine efficiency in the transitional load range.

Turning now to FIGURES 1–7, there is shown therein one embodiment of an internal combustion engine utilizing the stratified charge combustion process of the invention. It is constructed according to the requirements previously set out.

More specifically, FIGURE 1 illustrates one construction of a single cylinder of an internal combustion engine embodying the invention. It will be clear, of course, that any multiple of cylinders could be used without departing from the scope of the invention. The engine includes a cylinder block 11 having a bore 12 in which reciprocates a piston 13. A cylinder head (not shown, for clarity) has a flat face that encloses bore 12 and supports a fuel injection nozzle 14, a spark plug 15, an intake valve 16, and an exhaust valve, not shown. Intake valve 16 controls the flow of air through an offset intake port 17. The port being non-radial induces a swirl motion to the air during induction. The swirl rate is proportional to crankshaft speed and the only requirement is that it be repeatable from cycle to cycle and cylinder to cylinder.

A cup-shaped combustion chamber is located in the center of the piston. Such chamber shape, however, does not interfere with the rotational motion of the air charge.

The injection nozzle 14 in this case is constructed to provide the slow rates of dispersion of the fuel into the air used in FIGURES 8–16 by means of low injection pressures and particle velocities, and injection through a wide conical included angle to retard penetration of the fuel into the air sufficiently to prevent an excessive wetting of the cylinder walls.

More particularly, as best seen in FIGURE 17, the injection nozzle is of the outwardly opening poppet valve type. It includes a nozzle body 30 slidably receiving a valve 32.

The valve is loaded by a spring (not shown) acting against its upper end so that in the closed position it contacts the body 30, and, during operation, opens toward the engine cylinder. The contacting surfaces of both the valve face and valve seat are shown as conical, although one of them could be conical and the other spherical, or both of them spherical. The outside surfaces 34 and 36 of the nozzle valve and the tip of the nozzle body are conical surfaces which are nearly perpendicular to the tangent of the valve face and the valve seat surfaces. These outside surfaces are nearly in line with each other when the nozzle valve is closed.

The discharge orifice of the nozzle is the ring-shaped gap 38 that is formed between the valve seat and valve face during operation. When fuel is injected into the barrel 40 of the valve, by a positive displacement fuel injection pump, for example, fuel pressure builds up inside the nozzle. The fuel pressure overcomes the valve spring force and pushes the nozzle valve away from the valve seat. Fuel then flows out through the gap between the valve face and valve seat at the injection pressure, which is a function of the nozzle valve spring force and, therefore, a function of the valve opening height.

The injection pressure is only slightly higher than the nozzle valve opening pressure at low engine speeds. Therefore, the valve face moves only a small distance away from the valve seat. The injection pressure at low engine speeds can be varied by the change of the nozzle valve opening pressure, and at the maximum engine speed by a change of the spring rate of the nozzle valve spring. The adjustment of the injection pressures is important because the injection pressures determine the fuel discharge velocity.

The valve lift and the width of the discharge orifice gap 38 depend upon the fuel discharge velocity of the injection pressure, the valve diameter, and the rate of fuel flow through the nozzle.

The width of the discharge orifice gap at a given rate of injection and a fixed valve opening pressure can, of course, be varied by the use of different combinations of valve spring rates and nozzle valve diameters.

The adjustment of the discharge orifice width is also important because the size of the fuel droplets in the fuel spray depends to some degree upon the thickness of the fuel sheet discharged from the nozzle. The turbulent energy within the liquid fuel, the vibrations of the nozzle valve, and the friction between the fuel and the air break up the liquid fuel into fuel droplets with a higher efficiency in thin fuel sheets than in thick sheets. Consequently, the resultant size of fuel droplets is smaller.

Typical dimensions of this type fuel nozzle, which will provide the slow rates of continuing dispersion of the fuel into the air that are required by the process of the invention in automotive-size engine cylinders are:

The included cone angles of the valve face and valve seat surfaces, or the tangents of these surfaces, producing the required wide cone angle fuel sprays, are between approximately 45° and 180°. The valve opening pressures are lower than 700 p.s.i. and produce fuel discharge velocities less than 350 ft./sec. at 1000 engine r.p.m. The nozzle valve diameter and the spring rate of the nozzle valve spring are designed so that the width of discharge orifice gap is smaller than approximately 0.004 in. Orifice gaps are adjusted to produce fuel droplets with diameters not greater than two to five times the average droplet diameter in normal diesel fuel sprays. The nozzle valve stem is made longer than eight times the valve diameter to permit suitable accurate positioning of the valve face surface relative to the valve seat surface to permit adequate manufacturing tolerances on the valve face and valve seat surfaces. It is to be noted that fuel nozzles of other designs producing similar characteristic fuel sprays can also be used.

The fuel injection pump (not shown) used can be of a known type capable of producing the required low injection rates and long injection duration, and is capable of providing the required injection advance over the entire engine speed and load range of the engine.

The injection lines between the fuel injection pump and the fuel injector nozzles are properly tuned so that the quantity of fuel discharged from the fuel nozzles by pre-injection, after-injection, and after-dribble is negligible compared to the injected fuel quantities within the normal operation range.

Turning now to the operation, FIGURE 1 illustrates the engine during an initial stage of the intake stroke. The intake valve 16 has opened to permit the descending piston 13 to draw a charge of unthrottled pure air into the cylinder bore 12 through the intake port 17. Because of the off-center position of the intake valve, two large unbalanced eddies of opposite rotation are induced in the air charge during the intake stroke, imparting a net swirling motion to the intake air. A low rate of swirl that is repeatable from cycle to cycle and cylinder to cylinder is, therefore, induced. The inertia of the air will maintain this swirl during the remainder of the intake stroke and during the beginning of the compression stroke. The swirl rate is sufficiently low to prevent excessive turbulence when the fuel is injected and can be established without loss in volumetric efficiency.

During the compression stroke (FIGURE 2), intake valve 16 has closed, and the piston 13 moves upward from the bottom dead center position. During the initial ascent of the piston, the air charge within the cylinder bore 12 continues to swirl at the previously established rate.

As the piston more closely approaches its top dead center position (FIGURE 3), fuel injection is commenced. Referring now additionally to FIGURE 16, the timing of the beginning of injection will be dependent upon engine load, and the lengths of the various combustion and ignition and other delays will be in accordance with the schedule shown in FIGURE 16 for the particular quantity of fuel injected so that the short combustion and optimum performance without misfire or smoke will be provided.

Fuel, therefore, issues from injection nozzle 14 in a conical path, and the pressure of the fuel as it leaves the nozzle 14 is comparatively low (in the range of 500 to 700 p.s.i.). The velocity of the fuel particles, therefore, is also low. The fuel particles then travel along with the air to evaporate and form a cloud of fuel-air mixture.

As the piston 13 approaches its top dead center position (FIGURE 4), a squish action is promoted by the decreasing clearance between the piston head 19 and the adjacent surface of the cylinder head. This squish action forces the air and whatever fuel is present into the cavity 18; therefore, an air charge motion pattern prevails during the injection period, which is a combination of the charge transfer motion and a charge rotation. The charge transfer motion is concentric. The air flows nearly radially in over the edge of the combustion chamber cavity and in the center, it turns downward forming an air column which then spreads out along the bottom surface of the combustion chamber. In addition, the entire mass of air in the combustion chamber rotates due to the intake port design used.

Figure 7:
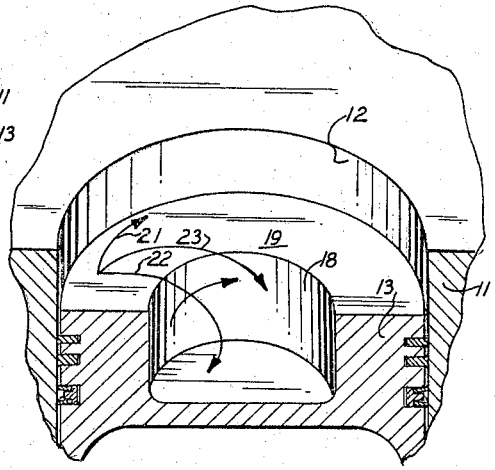
Figure 5:
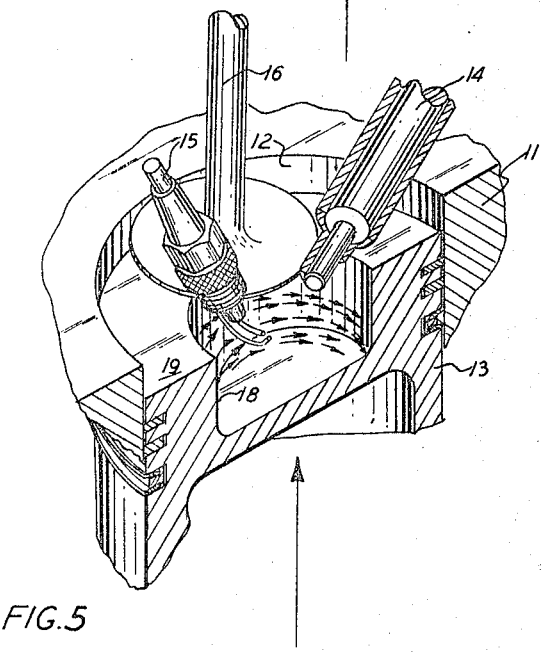

FIGURE 7 illustrates a vector diagram of the resulting air flow. The arrow designated 21 illustrates the direction of the air swirl prior to the squish action. The arrow 22 is a vector that represents the toroidal motion superimposed upon the swirling air by the squish action. The arrow 23 illustrates the resultant air motion. The compression of the air and mixture cloud into the chamber 18 also produces an increase in the rate of swirl to about double. By providing a 50% squish area, a low swirl rate of about three times crankshaft angular velocity, for example, is doubled to about six.

Figure 3:
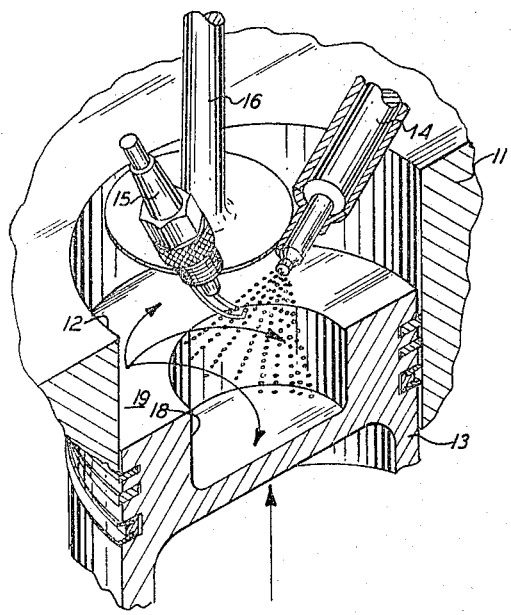
Figure 4:
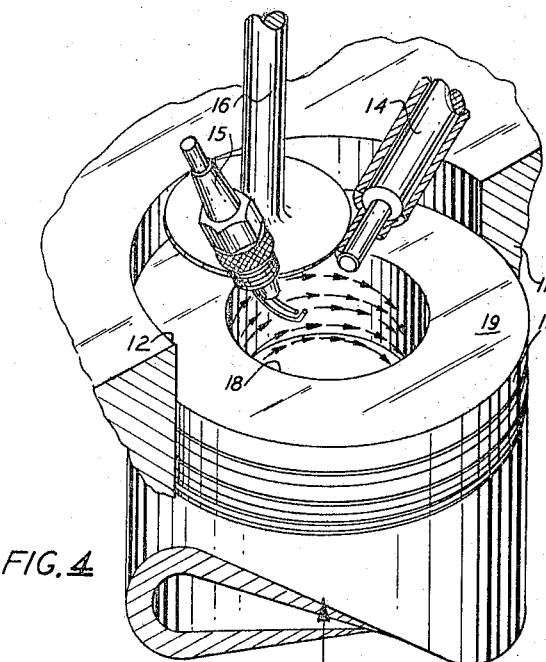

The center line of the fuel nozzle intersects the cylinder head face at an angle. This angle and the included cone angle of the fuel spray are such that the highest generatrix of the spray cone is nearly parallel with the cylinder head face, and the opposite generatrix is nearly parallel with the center line of the combustion chamber, as seen in FIGURE 3. The tip of the fuel nozzle is near the center line of the cylinder bore in order to utilize the air charge transfer motion for driving the part-load mixture to the combustion chamber surfaces where liquid fuel may be deposited.

Because of the near central location of the fuel nozzle, the rotation of the air charge in the combustion chamber cavity does not result in an excessively rapid dispersion of the small volume light-load mixtures. At light loads, the fuel is injected at the stages of the compression stroke when the air charge density is relatively high. Consequently, the fuel droplets are rapidly decelerated and remain in the central region of the combustion chamber where the dispersing effect of the air swirl is negligible.

It follows then that since the fuel nozzle tip is located near the center line of the cylinder bore, the combustion process of the invention will operate with a relatively high swirling air charge motion without causing an excessively rapid dispersion of the light-load mixtures. The swirl promotes the dispersion of the high-load mixtures, thus permitting the use of reduced injection advances at high loads. This condition thus permits simplification of the injection advance mechanism of the fuel injection pump and reduces wall wetting at high loads.

Relatively high-speed air swirl may be used, therefore, but such swirl is not necessary.

The spark gap is placed near the center line of the cylinder bore a distance below the nozzle tip. In this position, the gap is downstream from a portion of the fuel spray due to the charge transfer motion. Therefore, it is inside the mixture volume at the time of ignition under all operating conditions. It will be understood that the optimum position of the spark gap may vary when different intake port designs are used, which produce different swirling components in the air charge.

Figure 6:
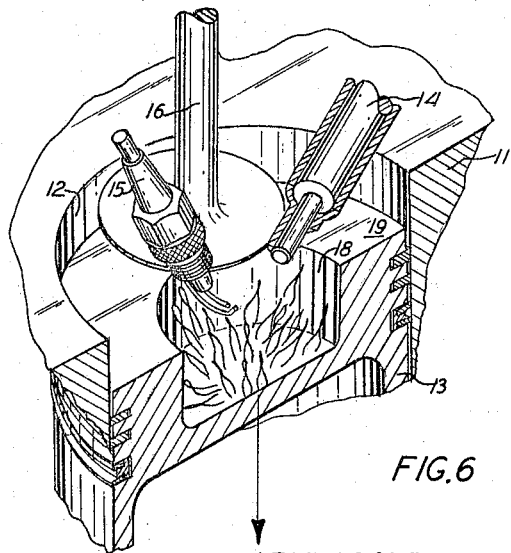

Upon ignition, after the correct ignition and combustion delays (FIGURE 16), the flame travels rapidly across the mixture cloud because of the turbulence caused by the increase in swirl rate (FIGURE 6). Any unevaporated fuel droplets remaining in the mixture cloud will rapidly evaporate due to the continuing low dispersion rate, change in air-fuel ratio, and the high temperature within the cloud.

As the piston commences its downward motion, the combustion products are mixed with the surrounding pure air by the reverse squish action that occurs. The resulting expansion proceeds with a higher coefficient of expansion due to the low temperature caused by mixing of the combustion products with the surrounding pure air.

The various injection and ignition timings selected in accordance with the schedules of FIGURES 8–16, together with the optimum low rates of dispersion of the fuel provided by nozzle 14, will, therefore, provide the short 40° maximum combustion duration without smoke or misfiring or an excessive wetting of the cylinder walls, and at the time in the engine cycle when the most efficient operation will be obtained at all loads.

From the foregoing, therefore, it will be seen that the invention provides a stratified charge combustion process for operation of an internal combustion engine in which fuel is burned in a substantial quantity of excess air at part loads, and full utilization of the air is made at full loads, by the use of the low optimum dispersion rates and also optimum ignition timings and combustion delays controlling the changes in air-fuel ratios and providing short combustion duration at an optimum time in the engine cycle of operation.

While the invention has been described in connection with its preferred embodiment, and one construction of an internal combustion engine and fuel nozzle has been illustrated for applying the process of the invention, it will be clear to those skilled in the arts to which the invention pertains that the process of the invention would have use in other cylinder designs and with fuel nozzles other than that shown in the drawings, and that many changes and modifications can be made without departing from the scope of the invention.

We claim:

1. A method of operating an internal combustion engine of the spark-ignition type at all load levels comprising
   inducting a charge of essentially unthrottled air into a combustion chamber with a swirl motion around the chamber essentially concentric with the cylinder axis and uniform to the extent that there are essentially no large scale disturbances of the flow pattern and the pattern is repeatable from cycle to cycle,
   injecting fuel as a liquid into a portion of the air in the combustion chamber and completing the injection before the end of the compression stroke,
   injecting at such low injection pressures and particle velocities and through such wide cone angles that the fuel enters the air in the cylinder bore in a spray of relatively large size liquid droplets sufficiently dispersed to result in a relatively slow induced spray air current that produces a slow dispersion and vaporization of the fuel droplets,
   to effect the formation of a fuel droplet/air mixture cloud having a low average air/fuel ratio and one that rotates slowly with the air in the chamber around the cylinder axis to slowly increase the average air/fuel ratio and the quantity of fuel vapor in said cloud,
   continuing the rotation of the mixture cloud around the cylinder axis without ignition past the point where the slow continuous vaporization of the fuel has increased the fuel vapor/air ratio of the cloud to a stage where the cloud is ignitable so that the average air/fuel ratio of the mixture cloud also further increases past the value at which the cloud is initially ignitable,
   and producing a spark ignition of the mixture cloud after the continuing vaporization of the fuel has increased both the fuel vapor/air ratio and the average air/fuel ratio of the mixture to predetermined values past the value permitting initial ignition of said cloud,
   so that a sufficient time period is established for the slow dispersion through said cloud of the flame resulting from ignition whereby the fuel in said cloud further vaporizes to a point providing a stable flame core and a subsequent rapid combustion of the mixture of a scheduled order.

2. A method as in claim 1, including injecting the liquid fuel into the air through such wide cone angles that the kinetic energy of the fuel droplets is dissipated into a relatively large mass of air, resulting in a deceleration of the droplets to a point where the fuel is moved away from the cylinder walls by the moving air before a substantial wetting of the walls can occur.

3. A method of operating an internal combustion engine of the spark-ignition type at all load levels comprising
   inducting a charge of essentially unthrottled air into a combustion chamber with a swirl motion around the chamber essentially concentric with the cylinder axis and uniform to the extent that there are essentially no large scale disturbances of the flow pattern and the pattern is repeatable from cycle to cycle,
   injecting fuel as a liquid into a portion of the air in the combustion chamber and completing the injection before the end of the compression stroke,
   injecting at such low injection pressures and particle velocities and through such wide cone angles that the fuel enters the air in the cylinder bore in a spray of relatively large size liquid droplets sufficiently dispersed to result in a relatively slow induced spray current that produces a slow dispersion and vaporization of the fuel droplets, to effect the formation of a fuel droplet/air mixture cloud having a low average air/fuel ratio and one that rotates slowly with the air in the chamber around the cylinder axis to slowly increase the quantity of fuel vapor in said cloud, continuing the rotation of the mixture cloud around the cylinder axis without ignition past the point where the slow continuous vaporization of the fuel has increased the fuel vapor/air ratio of the cloud to a stage where the cloud is ignitable so that the average air/fuel ratio of the mixture cloud also further increases past the value at which the cloud is initially ignitable, superimposing an essentially toroidal motion on said air and fuel by effecting a transfer of the mass of air and fuel in said chamber during the later stages of the compression stroke essentially radially inwardly toward the cylinder axis in an essentially concentric manner while maintaining the circumferential motion thereof around the cylinder axis to increase the density of the air and decelerate the fuel droplet dispersion while directing the mixture cloud essentially towards a central point in the cylinder where spark ignition is to occur, and producing a spark ignition of the mixture cloud during the transfer motion and after the continuing vaporization of the fuel has increased both the fuel vapor/air ratio and the average air/fuel ratio of the mixture to predetermined values sufficiently higher than the value permitting initial ignition of said cloud that misfire free combustion is assured, and so that a sufficient time period is established for the slow dispersion through said cloud of the flame resulting from ignition whereby the fuel in said cloud further vaporizes to a point providing a stable flame core and a subsequent rapid combustion of the mixture of a scheduled order.

4. A method as in claim 3, including producing said spark ignition of the cloud after the continued rotation of the cloud and vaporization of the fuel has increased the fuel vapor/air ratio and average air/fuel ratio of the mixture to a second predetermined higher level providing smoke-free combustion after ignition of the cloud.

5. The method of operating the internal combustion engine of claim 1, including controlling ignition of the cloud to effect combustion during rotation of the crankshaft through the top dead center position of the piston.

6. A method of operating the internal combustion engine of claim 1, including controlling ignition of the cloud to effect combustion during rotation of the crankshaft moving the piston to and past top dead center position, and injecting the fuel into the excess air as a liquid droplet spray through such wide cone angles that the kinetic energy of the fuel droplets is immediately dissipated into a relatively large mass of air.

7. A method of operating the internal combustion engine of claim 6, including varying the rates of dispersion of the fuel into the air as an inverse function of the quantity of fuel injected.

8. A method of operating the internal combustion engine of claim 1, including providing a spark ignition of the cloud at a point in the cycle when the fuel vapor/air ratio and average air/fuel ratio of the mixture are at values sufficiently higher than that initially permitting ignition of the cloud to assure a subsequent over-all burn rate providing a total combustion period to occur during rotation of the engine crankshaft through not more than approximately one-eighth of one revolution and during a period of rotation of the crankshaft moving the piston through the top dead center position during portions of the compression and power strokes.

9. A method of operating an internal combustion engine as in claim 1, including injecting the fuel into the air at a pressure lower than 700 p.s.i. at medium engine speeds.

10. A method of operating an internal combustion engine as in claim 1, including injecting the fuel into the air with particle velocities less than 350 ft./sec. at 1000 r.p.m.

11. A method of operating an internal combustion engine as in claim 1, including providing ignition of the mixture cloud at a point when the fuel vapor/air ratio and average air/fuel ratio of the mixture are at values sufficiently higher than that permitting initial ignition of the mixture to assure an over-all burn rate providing a total combustion period to occur within approximately a 40° rotation of the engine crankshaft during the compression and power strokes.

12. A method of operating an internal combustion engine as in claim 1, including ending the injection of the fuel prior to the completion of combustion.

13. A method of operating an internal combustion engine as in claim 1, including providing ignition of the cloud at medium load operation after the completion of the injection of fuel.

14. A method of operating an internal combustion engine as in claim 1, including providing a spark ignition of the cloud sufficiently past the point where the cloud initially becomes ignitable so that the fuel vapor/air ratio and average air/fuel ratio increase of the mixture reaches a value at ignition assuring a subsequent over-all burn rate providing a total combustion period to occur within a range of approximately 5° before top dead center position of the piston during the compression stroke and approximately 35° after top dead center position during the power stroke, at medium engine loads and speeds.

15. A method of operating an internal combustion engine as in claim 1, including providing ignition of the cloud when the fuel vapor/air ratio and average air/fuel ratio have increased to values assuring total combustion before the continuing vaporization of the fuel causes the mixture to reach an average air/fuel ratio of 21 to 1.

16. A method of operating an internal combustion engine as in claim 1, including injecting the fuel in a liquid spray having a conical included angle between approximately 45° and 180°.

17. A method of operating an internal combustion engine of the spark-ignition type at all load levels comprising inducting a charge of essentially unthrottled air into a combustion chamber with a swirl motion of approximately three to five times crankshaft speed around the chamber essentially concentric with the cylinder axis and uniform to the extent that there are essentially no large scale disturbances of the flow pattern and the pattern is repeatable from cycle to cycle, injecting fuel as a liquid into a portion of the air in the combustion chamber and completing the injection before the end of the compression stroke, injecting at injection pressures less than 700 p.s.i and particle velocities less than 350 ft./sec. at 1000 r.p.m. and through wide cone angles between 45° and 180° so that the fuel enters the air in the cylinder bore in a spray of relatively large size liquid droplets and the kinetic energy of the fuel droplets is dissipated into a relatively large mass of air, resulting both in a relatively slow induced air current that produces a slow dispersion and vaporization of the fuel droplets, and a deceleration of the droplets to a point where the fuel is moved away from the cylinder walls by the moving air before a substantial wetting of the walls can occur, to effect the formation of a fuel droplet/air mixture cloud having a low average air/fuel ratio and one that rotates slowly with the air in the chamber around the cylinder axis to slowly increase the quantity of fuel vapor in said cloud, continuing the rotation of the mixture cloud around the cylinder axis without ignition past the point where the slow continuous vaporization of the fuel has increased the fuel vapor/air ratio of the cloud to a stage where the cloud is ignitable so that the average air/fuel ratio of the mixture cloud also further increases past the value at which the cloud is initially ignitable, superimposing an essentially toroidal motion on said air and fuel by effecting a transfer of the mass of air and fuel in said chamber during the later stages of the compression stroke essentially radially inwardly toward the cylinder axis in an essentially concentric manner while maintaining the circumferential motion thereof around the cylinder axis to increase the density of the air and decelerate the fuel droplet dispersion while directing the mixture cloud essentially towards a central point in the cylinder where spark ignition is to occur, and producing a spark ignition of the mixture cloud during the transfer motion and essentially in the central portion of the cylinder bore inside the mixture volume after the continuing vaporization of the fuel has increased both the fuel vapor/air ratio and the average air/fuel ratio of the mixture to predetermined values higher than the value permitting initial ignition of said cloud and ones assuring misfire and essentially smokeless combustion, so that a sufficient time period is established for the slow dispersion through said cloud of the flame resulting from ignition whereby the fuel in said cloud further vaporizes to a point providing a stable flame core and a subsequent rapid combustion of the mixture of a scheduled order providing complete combustion within a 40° crank angle rotation of the engine crankshaft through portions of both the compression and power strokes.

References Cited by the Examiner

UNITED STATES PATENTS

| | | | |
|---|---|---|---|
| 2,484,009 | 10/1949 | Barber | 123—32 |
| 2,767,692 | 10/1956 | Barber | 123—32 |
| 2,832,324 | 4/1958 | Barber | 123—32 |
| 2,882,873 | 4/1959 | Witzky | 123—32 |
| 3,094,974 | 6/1963 | Barber | 123—32 |
| 3,154,059 | 10/1964 | Witzky et al. | 123—32 |

OTHER REFERENCES

Fuel Injection into swirling air is practical stratification system, based on paper by Hussman Kahoun and Taylor, pages 56 and 60–64, SAE Journal, April 1963.

MARK NEWMAN, *Primary Examiner.*

LAURENCE M. GOODRIDGE, CARLTON R. CROYLE, *Examiners.*